United States Patent
Shimizu et al.

(10) Patent No.: US 6,494,286 B2
(45) Date of Patent: Dec. 17, 2002

(54) VEHICLE WITH FUEL CELL SYSTEM MOUNTED THEREON

(75) Inventors: Kiyoshi Shimizu, Saitama (JP); Mamoru Yoshikawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/552,680

(22) Filed: Apr. 19, 2000

(65) Prior Publication Data

US 2002/0100622 A1 Aug. 1, 2002

(30) Foreign Application Priority Data

Apr. 28, 1999 (JP) ............................................ 11-121609

(51) Int. Cl.⁷ ................................................ B60K 1/00
(52) U.S. Cl. ....................................... 180/299; 180/65.3
(58) Field of Search ............................... 180/65.1, 65.2, 180/291, 292, 299, 165, 65.3, 297

(56) References Cited

U.S. PATENT DOCUMENTS 6,223,843 B1 * 5/2001 O'Connell et al. ........ 180/65.3

* cited by examiner

Primary Examiner—Frank Vanaman
(74) Attorney, Agent, or Firm—Arent Fox Kintner Plotkin & Kahn, PLLC

(57) ABSTRACT

A motor 1 for traveling is attached to a frame 6 of a vehicle via mounts 3, 4 and 5 absorbing vibration. An air compressor 10 and an air compressor driving motor 11 are attached with respect to said motor 1 for traveling. The mounts 3, 4 and 5 are placed to be shared mounts absorbing vibration of the motor 1 for traveling, the air compressor 10 and the air compressor driving motor 11.

7 Claims, 9 Drawing Sheets

VEHICLE WITH FUEL CELL SYSTEM MOUNTED THEREON

FIELD OF THE INVENTION

The present invention relates to a vehicle with a fuel cell system mounted thereon.

BACKGROUND OF THE INVENTION

Recently, an electric vehicle is known as a vehicle driven by electricity. The electric vehicle has a motor for traveling. The electric vehicle requires accessories such as a water pump, an air-conditioner compressor, a brake negative pressure pump and the like for operating as a vehicle. Some conventional electric vehicles adapted a system wherein the accessory is driven by the motor for traveling.

There is a period of time in which the motor for traveling runs at idle, e.g., the electric vehicle is stopped, therefore, for driving the accessory, there is a case in which the vehicle is operated within an inefficient region of the motor for traveling. At start of the electric vehicle, the motor is put under heavy load and large capacity of a clutch is required in accordance with the load, therefore, the system is inefficient and costly.

To solve the above-described problems, accessories of a conventional electric vehicle is attached to the vehicle body directly. A motor is provided with respect to each accessory for driving the accessory.

The accessories and the motors for driving the accessories generate vibration and noise (hereafter referred to as vibration and the like), therefore, when the accessories and the motors are attached to the vehicle body directly, there is apprehension that the vibration and the like is increased. However, the accessories and the motors for driving the accessories do not generate significant vibration and the like. Therefore, even if the accessories and the motors are attached to the vehicle body directly, a rubber mount absorbs the vibration and the like sufficiently.

More recently, development of a vehicle with a fuel cell system mounted thereon, e.g., a fuel cell electric vehicle (FCEV) has flourished. A fuel cell system used for the fuel cell electric vehicle is an electric power generation system having a fuel cell as the core, which supplies hydrogen as fuel gas to an anode of the fuel cell and supplies oxidized gas including oxygen such as air to a cathode of the fuel cell to generate electricity.

The fuel cell system has an air compressor for supplying the oxidized gas to the fuel cell and requires a drive motor for driving the air compressor.

However, the air compressor generates large vibration and the like, therefore, when the air compressor is attached to the vehicle body directly, vibration and the like is too large and an exclusive mount member for shutting out the vibration and the like must be provided. When the exclusive mount member is provided, there is problem that weight and cost are increased by an amount of the exclusive mount member.

On the other hand, a conventional electric vehicle is provided with a motor for driving each accessory, therefore, the conventional electric vehicle requires more motors by the number of accessories and there is problem that cost is increased.

SUMMARY OF THE INVENTION

An object of the present invention is to restrain vibration and the like in a vehicle with a fuel cell system mounted thereon without using a mount member for exclusive use of an air compressor.

Another object of the present invention is to drive an accessory of a vehicle with a fuel cell system mounted thereon without providing many motors.

To solve the above-described problems, a first aspect of the present invention is a vehicle with a fuel cell system mounted thereon wherein
 a motor for traveling is attached to a frame of a vehicle via a mount absorbing vibration;
 an air compressor and an air compressor driving motor are attached with respect to the motor for traveling and the mount is placed to be a shared mount absorbing vibration of the motor for traveling, the air compressor and the air compressor driving motor.

According to the first aspect of the present invention, the air compressor and the air compressor driving motor for driving the air compressor are attached with respect to the motor for traveling. Therefore, the mount absorbing vibration and the like of the motor for traveling absorbs vibration and the like of the air compressor and the air compressor driving motor and operates as the shared mount. Accordingly, vibration and the like of the air compressor can be restrained without providing an exclusive mount member.

A second aspect of the present invention according to the first aspect is a vehicle with a fuel cell system mounted thereon wherein at least a part of accessories of a vehicle with a fuel cell system mounted thereon is attached to the motor for traveling.

According to the second aspect of the present invention, in addition to the air compressor, accessories such as a water pump, an air-conditioner compressor, a brake negative pressure pump and the like are attached to the motor for traveling, therefore, vibration and the like generated on these accessories can be absorbed by the shared mount at the same time.

The term of "accessories of a vehicle with a fuel cell system mounted thereon" used in the present specification means accessories used for a fuel cell system including air compressor, in addition, e.g., accessories used for the vehicle itself such as a water pump, an air-conditioner compressor, a brake negative pressure pump, a power steering pump, a lubricating oil pump and an alternator.

A third aspect of the present invention according to the first or second aspect is a vehicle with a fuel cell system mounted thereon wherein width of an area made up of the whole accessories attached to the motor for traveling in a fore-and-aft direction is narrower than width of the motor for traveling in a fore-and-aft direction, and the whole accessories is placed within the width of the motor for traveling in a fore-and-aft direction.

According to the third aspect of the present invention, width of the accessories attached to the motor for traveling in a fore-and-aft direction is placed within the width of the motor for traveling. Therefore, the accessories are not protruded from the width of the motor for traveling in a fore-and-aft direction. Accordingly, e.g., when a fuel cell electric vehicle causes an collision accident, a problem is prevented such that accessories, which are smaller than the motor for traveling, are protruded from the motor for traveling toward a seat side and the accessories are an obstacle to an occupant or the like.

A forth aspect of the present invention according to the second or third aspect is a vehicle with a fuel cell system mounted thereon wherein a plurality of the accessories attached to the motor for traveling are driven integrally by the air compressor driving motor.

According to the forth aspect of the present invention, the accessories attached to the motor for traveling are driven integrally by the air compressor driving motor. Therefore, a motor for driving each accessory becomes unnecessary and the number of the motors can be reduced.

A fifth aspect of the present invention according to the forth aspect is a vehicle with a fuel cell system mounted thereon comprising a control device for controlling the number of revolutions of the air compressor driving motor in accordance with an amount of load generated from the accessories driven by the air compressor driving motor.

According to the fifth aspect of the present invention, a plurality of the accessories are driven by only the air compressor driving motor and at the same time, the number of revolutions of the air compressor driving motor is controlled in consideration of the load of each accessory, i.e., current of the air compressor driving motor is corrected. Therefore, the air compressor driving motor is controlled suitably on the basis of the load of each accessory.

DESCRIPTION OF THE PREFERRED EMBODIMENTS

An embodiment of the present invention will now be described specifically by referring to drawings.

Figure 1:
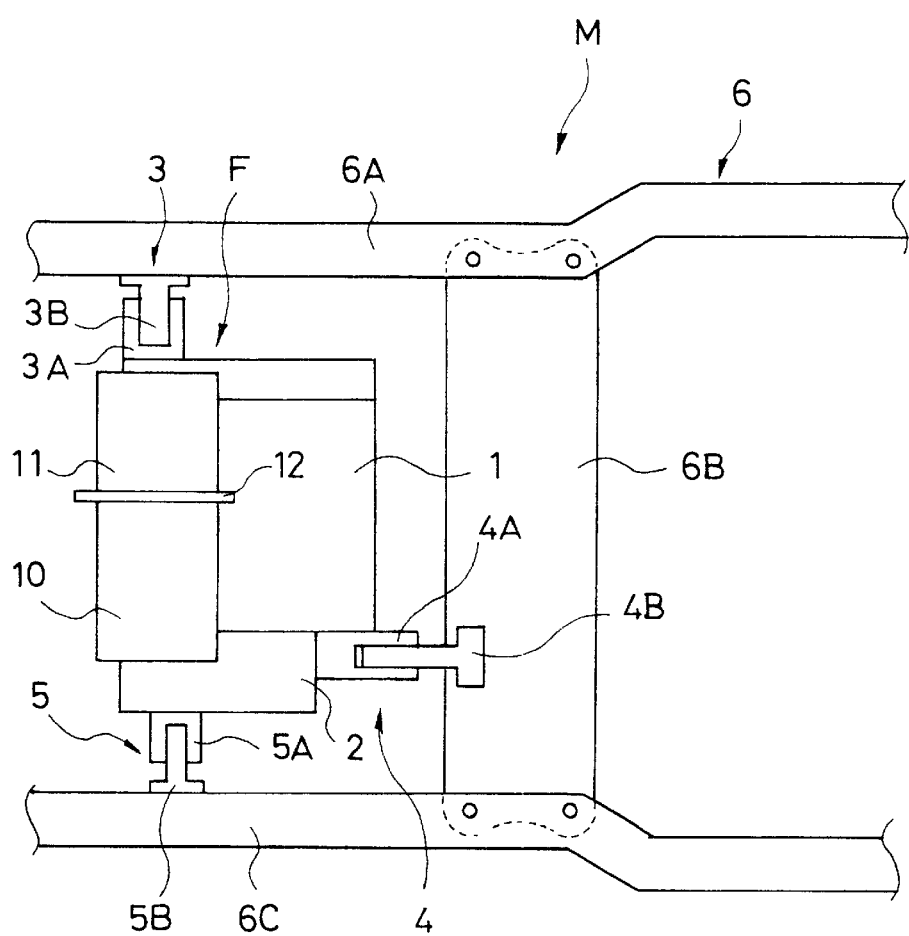
FIG. 1 is a plan view of a driving part of a fuel cell electric vehicle of the present invention.
Figure 2:
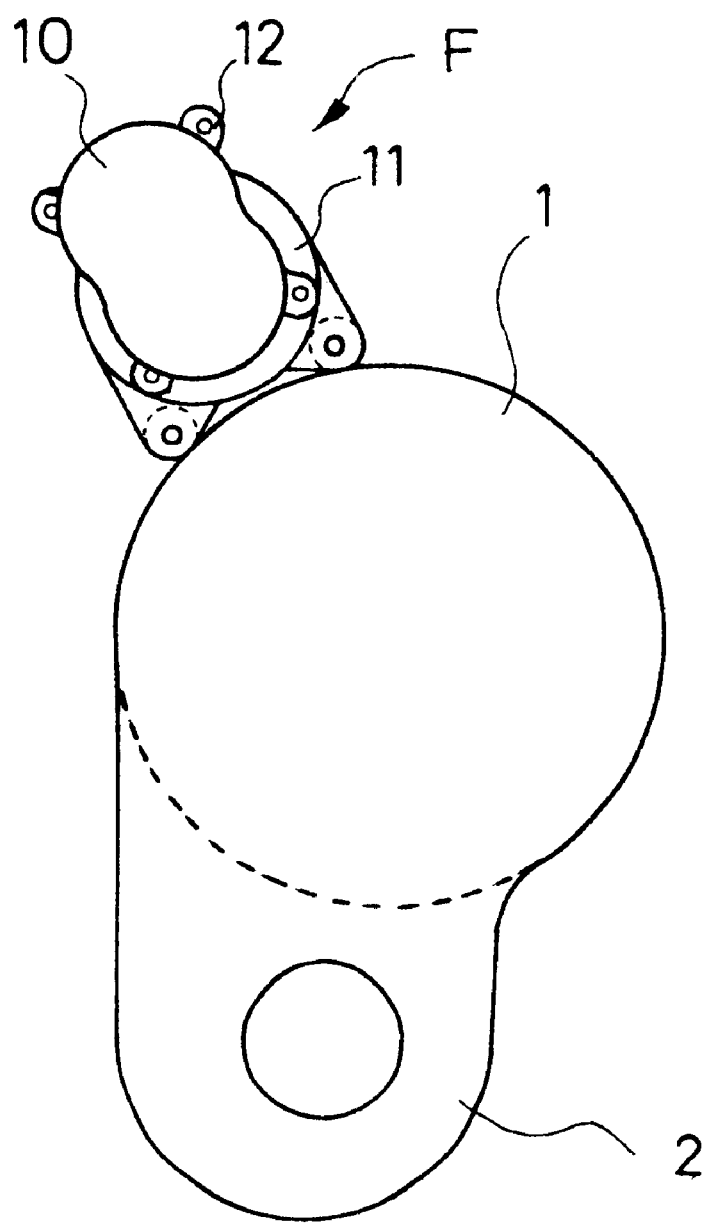
FIG. 2 is a sectional side view of the driving part of the fuel cell electric vehicle of the present invention.
Figure 3:
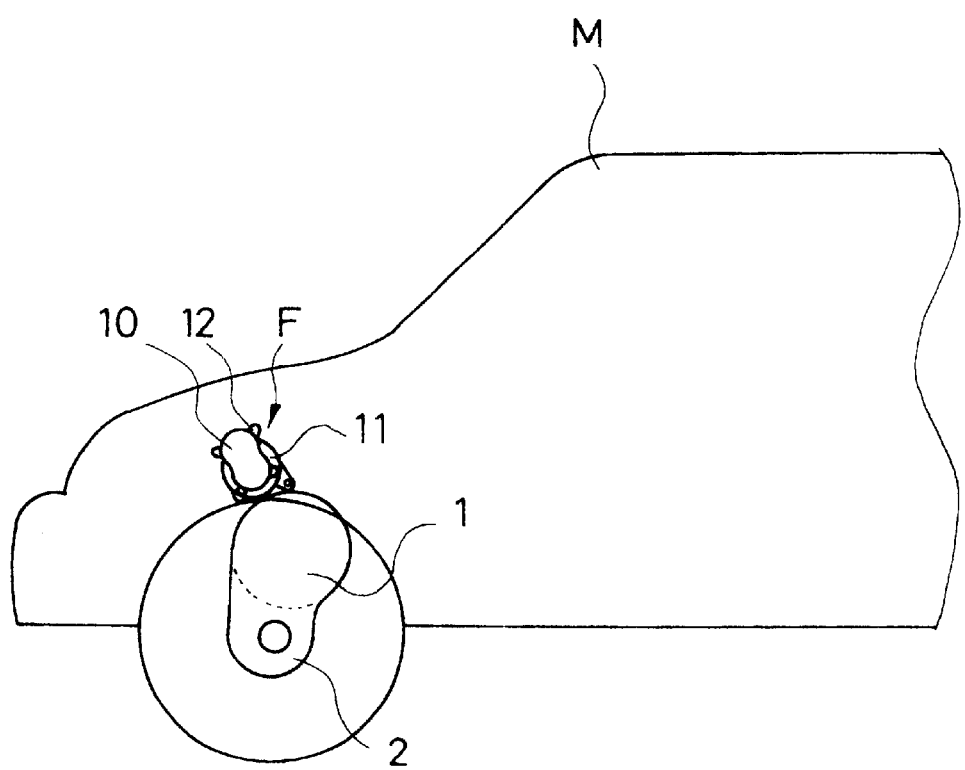
FIG. 3 is a side view showing an overview of a forward part of the fuel cell electric vehicle of the present invention.

FIG. 1 is a plan view of a driving part of a fuel cell electric vehicle of the present invention, FIG. 2 is a sectional side view of it and FIG. 3 is a side view showing an overview of a forward part of the fuel cell electric vehicle.

As shown in FIG. 1 and FIG. 3, the fuel cell electric vehicle M with a fuel cell system mounted thereon according to the present invention has a motor 1 for traveling. The motor 1 for traveling has a reduction gear 2, which controls the number of revolutions of the motor 1 for traveling and transfers power to a drive shaft (not shown). The motor 1 for traveling, as shown in FIG. 1, is fixed to a vehicle body frame 6 via a first mount member 3, a second mount member 4 and a third mount member 5. Each mount member 3, 4 and 5 has a bracket 3A, 4A and 5A, and a rubber mount 3B, 4B and 5B, respectively, and these are connected by a fastener such as a bolt and a nut (not shown), respectively. As for the rubber mounts, a known rubber mount such as a liquid-filled mount can be used as appropriate.

Figure 4:
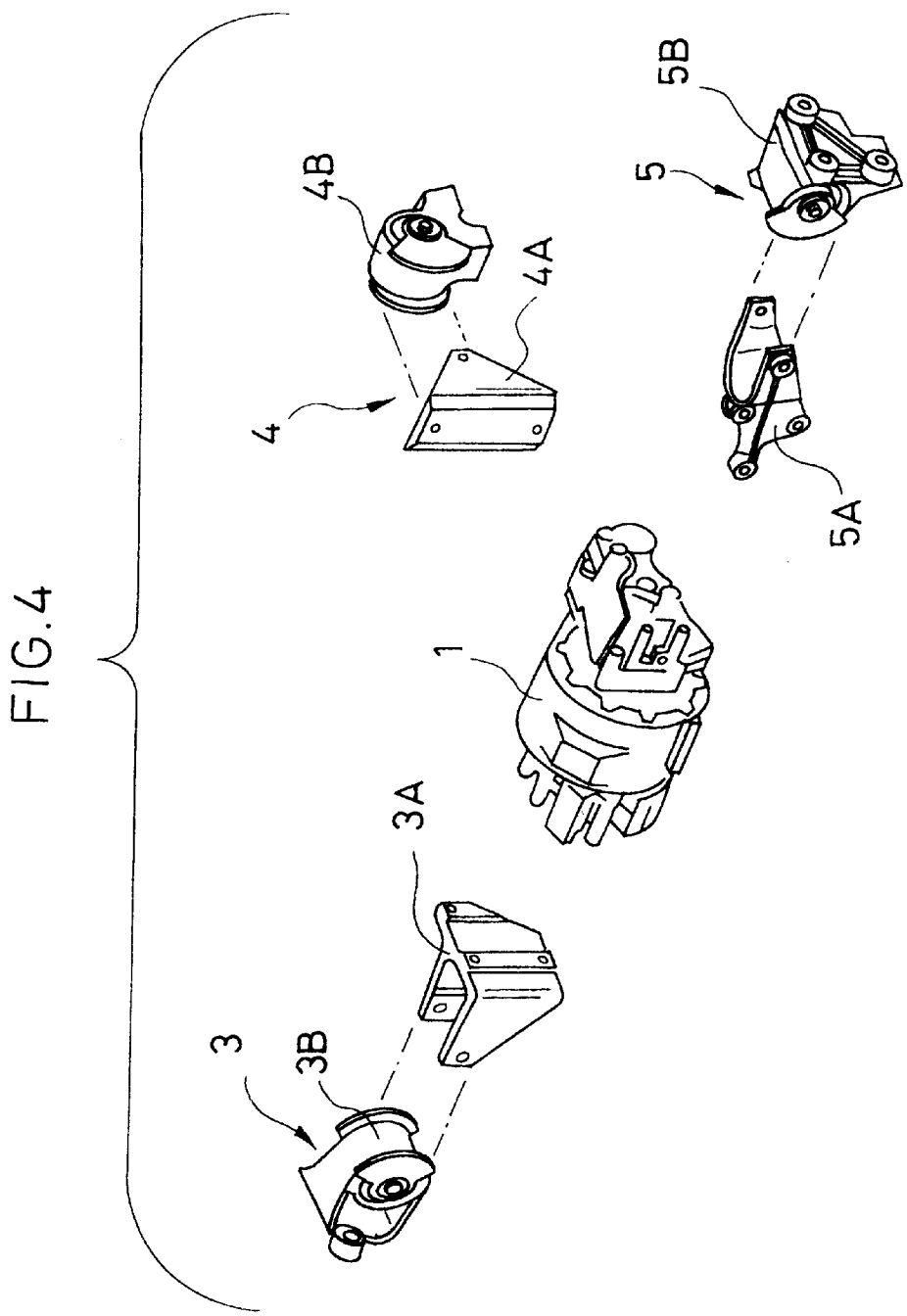
FIG. 4 is a side view of another example of the driving part of the fuel cell electric vehicle of the present invention.

As shown in FIG. 1 and FIG. 4, the rubber mount 3B of the first mount member 3 is fixed to a right frame 6A of the vehicle body frame 6 and the bracket 3A of the first mount member 3 is fixed to the motor 1 for traveling. The rubber mount 4B of the second mount member 4 is fixed to a cross member 6B of the vehicle body frame 6 and the bracket 4A of the second mount member 4 is fixed to the motor 1 for traveling or the reduction gear 2. The rubber mount 5B of the third mount member 5 is fixed to a left frame 6C of the vehicle body frame 6 and the bracket 5A of the third mount member 5 is fixed to the reduction gear 2. Vibration and the like of the motor 1 for traveling is absorbed by each mount member 3, 4 and 5.

As shown in FIG. 1 and FIG. 2, an air compressor 10 and an air compressor driving motor 11, which form a part of a fuel cell system, are attached to the motor 1 for traveling. The air compressor 10 forms a part of accessories F, which consists of a plurality of accessories of the present invention. As shown in FIG. 1, the air compressor 10 is fixed to the air compressor driving motor 11 and the air compressor driving motor 11 is bolted, attached and fixed to the motor 1 for traveling by a bolt (not shown) via a joint 12. The fuel cell system has an evaporator, a reforming device, a carbon monoxide removing device or the like (not shown).

As described above, both of the air compressor 10 and the air compressor driving motor 11 are supported by the motor 1 for traveling substantially and placed without contacting with the vehicle body frame 6. Therefore, even if vibration and the like from the air compressor 10 and the air compressor driving motor 11 is large comparatively, absorbed by the mount members 3, 4 and 5 so that an amount of vibration and the like to be transmitted to the vehicle body frame 6 is reduced greatly. While vibration and the like from the air compressor 10 and the air compressor driving motor 11 is restrained effectively, mount members for exclusive use of the air compressor 10 and the air compressor driving motor 11 need not be provided. More specifically, each mount member 3, 4 and 5 for the motor 1 for traveling also serves as a mount member for the air compressor 10 and the air compressor driving motor 11 and operates a shared mount in the present invention.

Next, a second embodiment of the present invention will be described.

Figure 5:
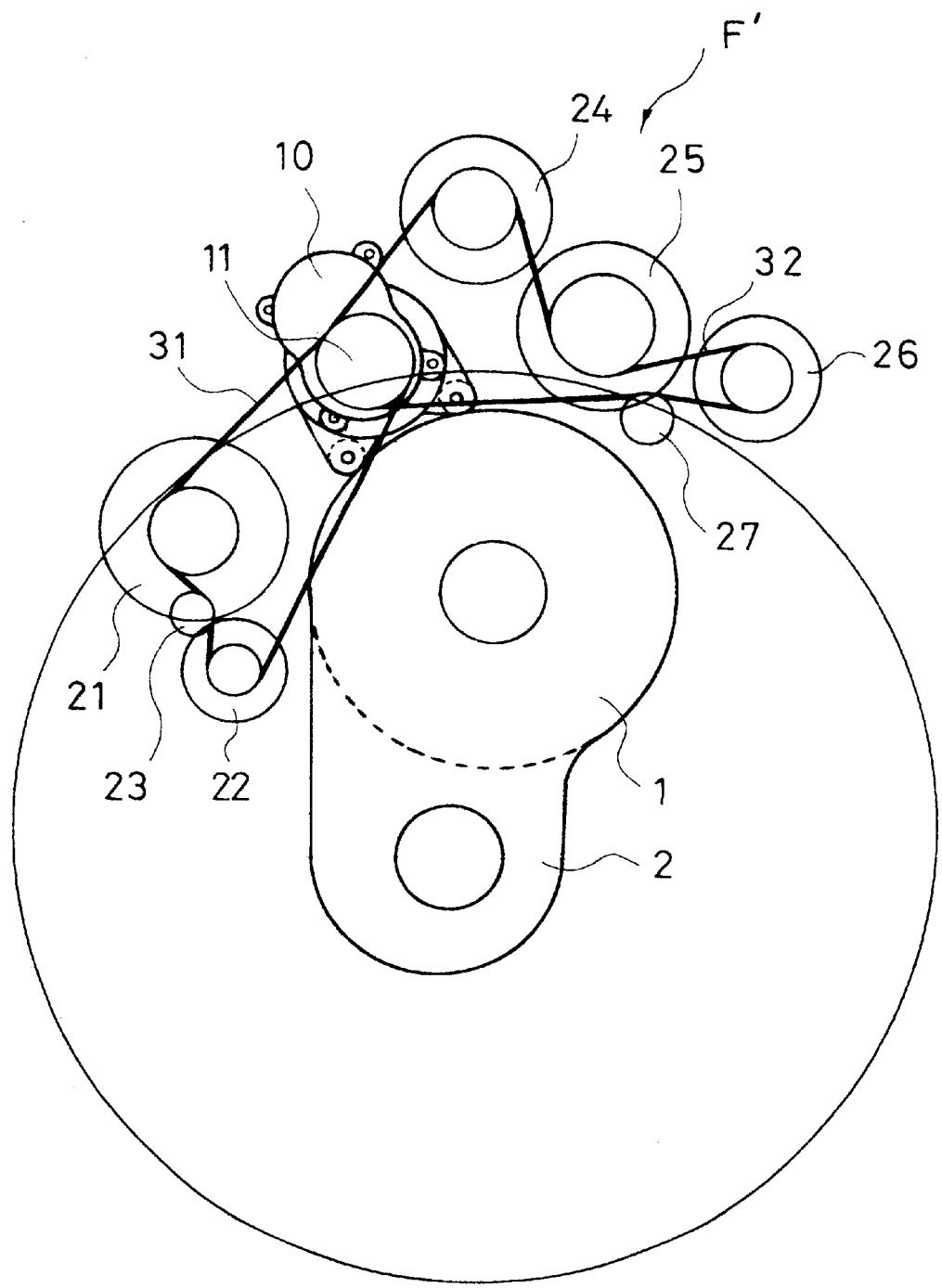
FIG. 5 is a side view of an overview showing layout at attaching accessories of the fuel cell electric vehicle to a motor for traveling.

FIG. 5 is a side view of an overview showing layout at attaching accessories F' of a fuel cell electric vehicle M to a motor 1 for traveling in the present invention. The present embodiment is an example in which the accessories F' of a fuel cell electric vehicle M are attached to a motor 1 for traveling.

As shown in FIG. 5, the accessories F' of the fuel cell electric vehicle M in the present invention are attached to a motor 1 for traveling. More specifically, an alternator 21 and a cooling water pump 22 are placed on the left and connected to an air compressor driving motor 11 by a first belt 31. Tension of the first belt 31 is adjusted by an idler 23. On the other hand, a negative pressure pump 24, an air-conditioner compressor 25 and a power steering pump 26 are placed on the front to the right and connected to an air compressor driving motor 11 by a second belt 32. The second belt 32 is stretched by a tensioner 27.

As described above, the accessories F' are attached to a motor 1 for traveling, therefore, in addition to vibration and the like from the air compressor 10 and the air compressor driving motor 11, vibration and the like from another accessory can be absorbed by the mount members 3, 4 and 5.

In the present embodiment, width of an area made up of the whole accessories F' attached to the motor 1 for traveling in a fore-and-aft direction is wider than width of the motor 1 for traveling. On the other hand, as shown in FIG. 6A, the width of an area made up of the whole accessories F' in a fore-and-aft direction can be narrower than width L of the motor 1 for traveling and of the whole accessories F' in a fore-and-aft direction can be placed to be within the width L of the motor 1 for traveling. In this layout, when a fuel cell electric vehicle causes a collision accident, the possibility of an accident is prevented such that any accessory of the accessories F' is protruded toward a seat side (not shown) and the accessory makes contact with and hurt an occupant or the like.

Figure 6B:
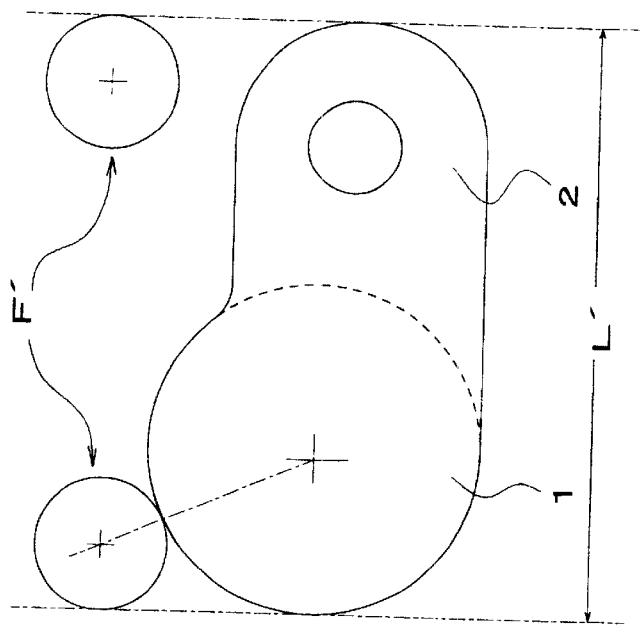
FIG. 6B is a side view of an overview showing a further example of layout at attaching accessories of the fuel cell electric vehicle to a motor for traveling.
Figure 6A:
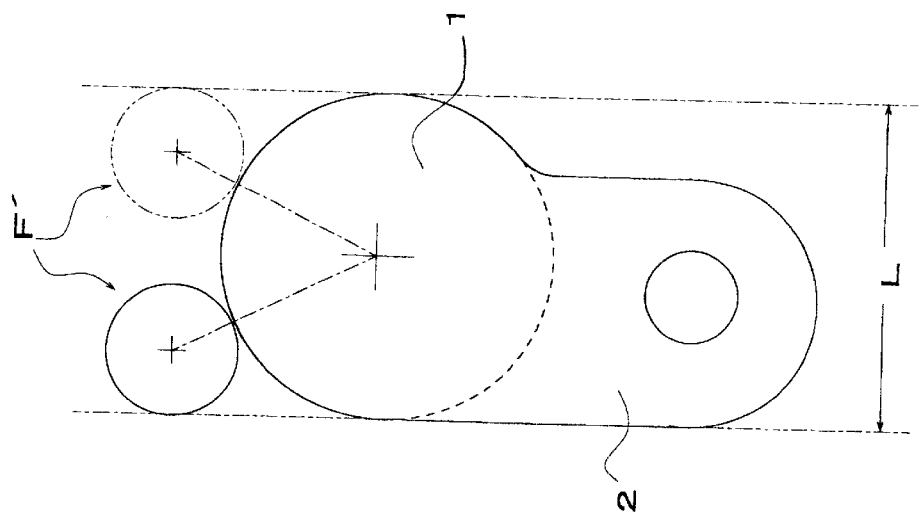
FIG. 6A is a side view of an overview showing another example of layout at attaching accessories of the fuel cell electric vehicle to a motor for traveling.

When the motor 1 for traveling is placed horizontally, as shown in FIG. 6B, width L' of the motor 1 for traveling is wide comparatively.

Next, a control method for the air compressor driving motor 11 of the fuel cell electric vehicle M in the second embodiment will be described by referring to the flowcharts shown in FIGS. 7 to 9.

Figure 7:
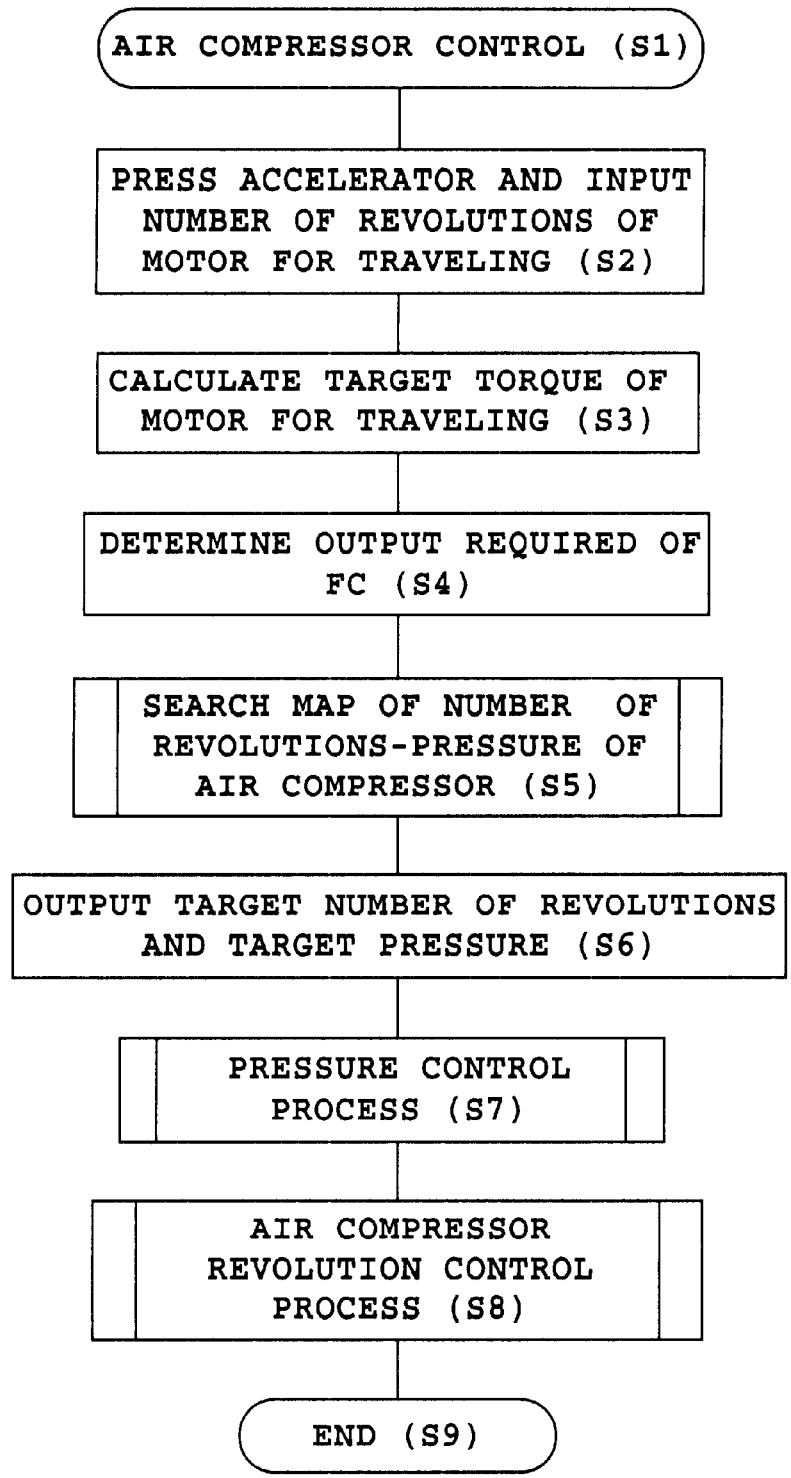
FIG. 7 is a flowchart showing a control process of an air compressor.
Figure 8:
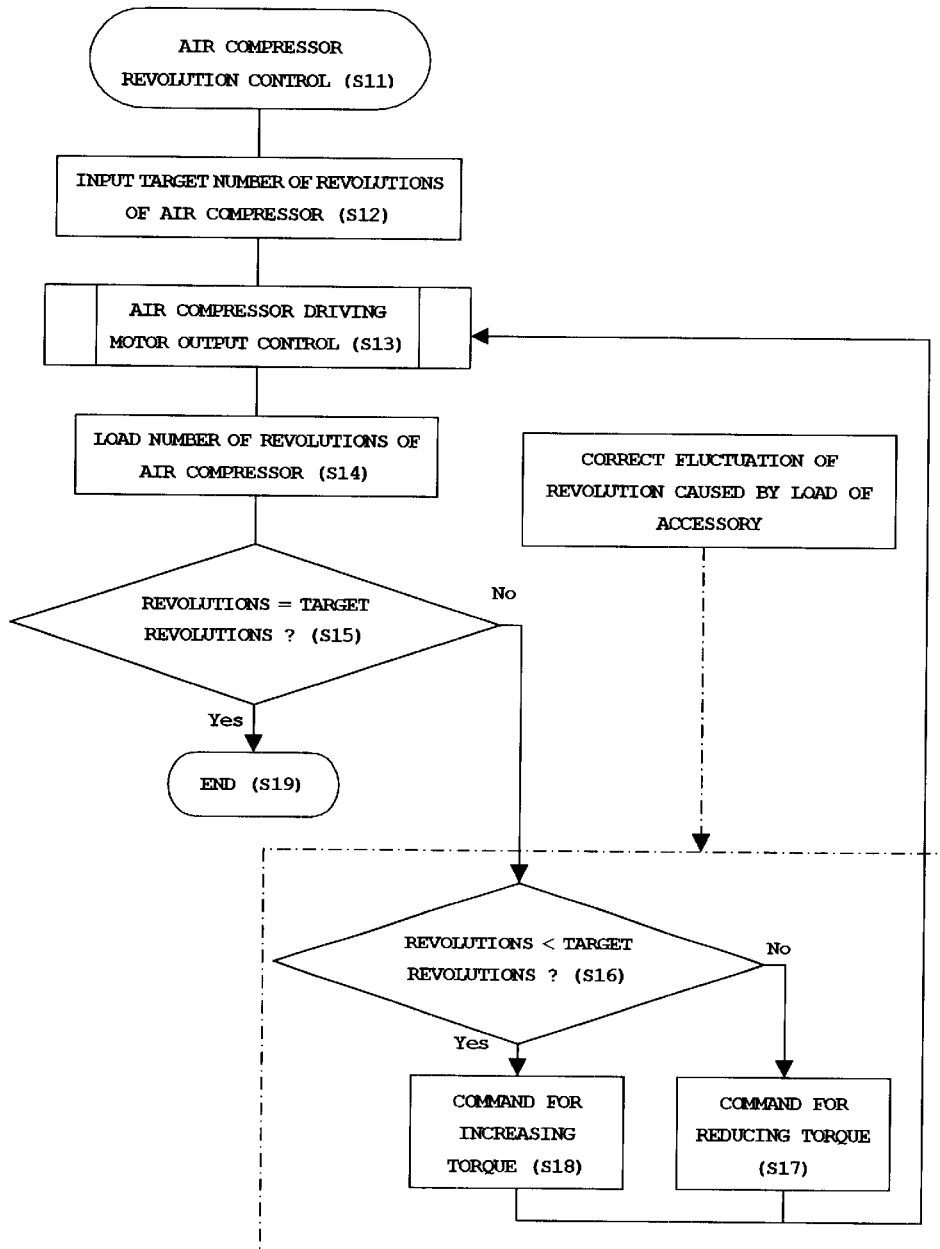
FIG. 8 is a flowchart showing a control process of revolution of the air compressor.
Figure 9:
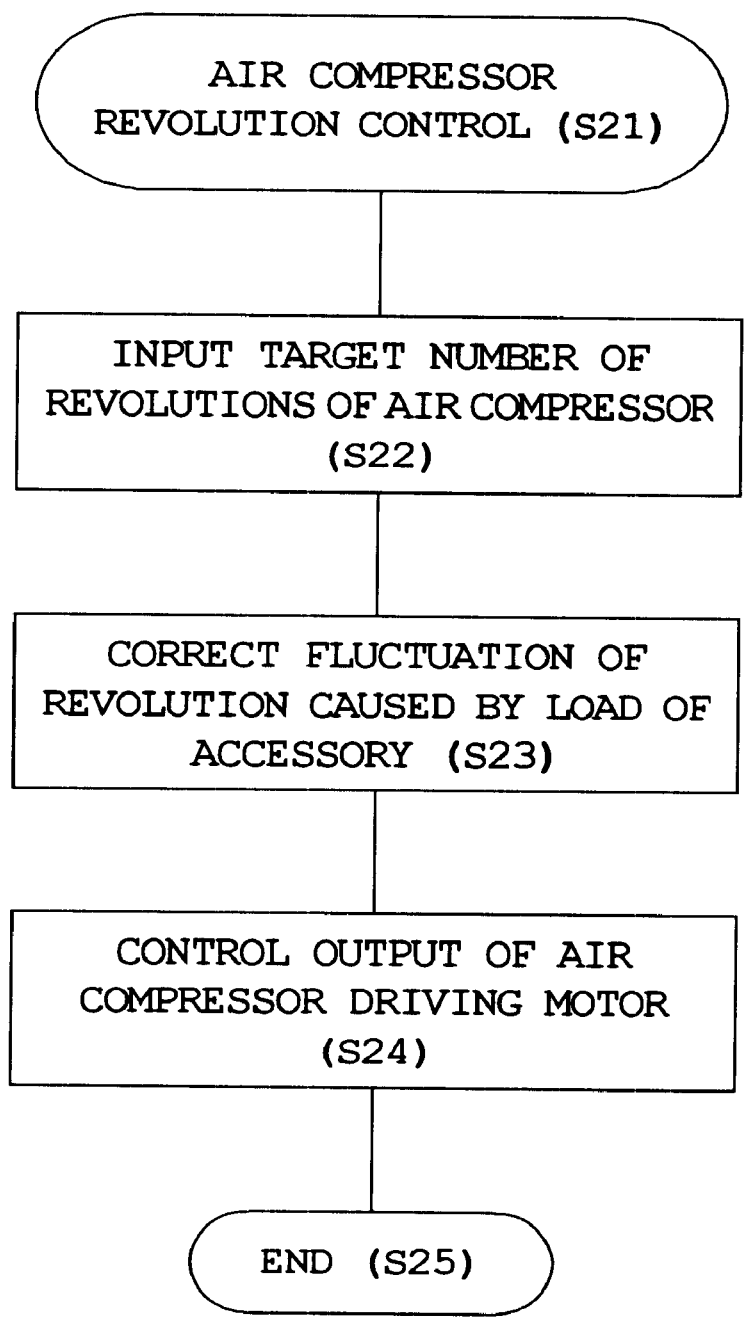
FIG. 9 is a flowchart showing another control process of revolution of the air compressor.

FIG. 7 is a flowchart showing a control process of an air compressor 10 of the present invention, FIG. 8 is a flowchart showing a control process of revolution of the air compressor 10 and FIG. 9 is a flowchart showing another control process of revolution of the air compressor 10. These control operations are carried out by a control device (not shown).

As shown in FIG. 7, control of the air compressor 10 starts (S1) and a driver presses down on the accelerator and the number of revolutions of the motor 1 for traveling is input (S2). In accordance with the input number of revolutions, target torque of the motor 1 for traveling is calculated (S3) and output required of a fuel cell system (FC) is determined (S4).

For meeting the required output, target number of revolutions and target pressure of the air compressor 10 is searched by a search map of the number of revolutions-pressure of the air compressor 10 (S5). The searched target number of revolutions and the searched target pressure of the air compressor 10 are output (S6) and pressure control process is carried out (S7). Air compressor revolution control process is carried out (S8) and control of the air compressor 10 is finished (S9).

Revolution control of the air compressor 10 carried out in step S8 is now described specifically.

As shown in FIG. 8, revolution control of the air compressor 10 starts (S11), the target number of revolutions of the air compressor 10 is input (S12) and output control of the air compressor driving motor 11 starts (S13). The number of revolutions of the air compressor 10 at present is loaded (S14) and it is determined whether the number of revolutions of the air compressor 10 is equal to the target number of revolutions of the air compressor 10 (S15). When the number of revolutions of the air compressor 10 is not equal to the target number of revolutions of the air compressor 10, torque of the air compressor driving motor 11 is corrected. In the present embodiment, when the torque of the air compressor driving motor 11 is calculated, fluctuation of revolution of the air compressor driving motor 11 caused by load of accessory, i.e., current of the air compressor driving motor 11 is corrected.

The fluctuation of revolution caused by the load of the accessory will be described with taking FIG. 5 as an example. According to the present usage pattern of the alternator 21 and the cooling water pump 22 connected each other by the first belt 31, required load of these is calculated. According to the present usage pattern of the negative pressure pump 24, the air-conditioner compressor 25 and the power steering pump 26 connected each other by the second belt 32, required load of these is calculated.

The number of revolutions of the air compressor 10 is compared with the target number of revolutions of the air compressor 10 (S16). When the number of revolutions of the air compressor 10 is larger than the target number of revolutions of the air compressor 10, a command for reducing torque of the air compressor driving motor 11 is issued to the air compressor driving motor 11 (S17). An amount of the reduction of the torque is calculated as appropriate in accordance with difference between the number of revolutions of the air compressor 10 and the target number of revolutions of the air compressor 10. When the number of revolutions of the air compressor 10 is smaller than the target number of revolutions of the air compressor 10, a command for increasing the torque of the air compressor driving motor 11 is issued to the air compressor driving motor 11 (S18). An amount of the increase of the torque is calculated as appropriate in accordance with difference between the number of revolutions of the air compressor 10 and the target number of revolutions of the air compressor 10 as with reducing the torque. When the amount of reduction or increase of the air compressor driving motor 11 is calculated, the fluctuation of revolution caused by the load of the accessory is considered.

According to the amount of reduction or increase issued to the air compressor driving motor 11, the output control of the air compressor driving motor 11 is carried out (S13). The similar routine is repeated and the revolution control of the air compressor 10 is finished (S19) when the number of revolutions of the air compressor 10 is equal to the target number of revolutions of the air compressor 10 in step S15.

The revolution control of the air compressor 10 by feedback control has been described, however, as another example, the revolution control of the air compressor 10 by feed forward control will be described.

A flow of the feed forward control will described by referring to FIG. 9. First, the revolution control of the air compressor 10 starts (S21) and the target number of revolutions of the air compressor 10 is input (S22). In addition to load used for the air compressor 10, in consideration of the fluctuation of revolution of the air compressor driving motor 11 caused by the load of the accessory, the target number of revolutions of the air compressor 10, i.e., current of the air compressor driving motor 11 is corrected. As for elements of load of the accessory, there is, specifically, e.g., anything for detecting ON/OFF of air-conditioner clutch and detecting an amount of load of the air-conditioner compressor 25. Hydraulic pressure of the power steering pump 26 can be considered and an amount of load of the power steering pump 26 can be calculated by detecting an angle of a handle. Moreover, an amount of electricity generated by the alternator 21 is detected and an amount of load of the alternator 21 can be calculated from the generated electricity. The target number of revolutions of the air compressor 10, i.e., current of the air compressor driving motor 11 is corrected on the basis of the load of the accessories (S23).

Output of the air compressor driving motor 11 is controlled on the basis of the corrected target number of revolutions of the air compressor 10 (S24) and the revolution control of the air compressor 10 is finished (S25). The output control is carried out each predetermined period of time, therefore, the revolution control of the air compressor 10 can be carried out by feed forward control.

As described above, according to the present invention, vibration and the like in a vehicle with a fuel cell system mounted thereon can be restrained without using a mount member for exclusive use of an air compressor.

Moreover, an accessory of a vehicle with a fuel cell system mounted thereon can be driven without providing many motors.

What is claimed is:

1. A vehicle with a fuel cell system comprising:

at least three mount members attached to a frame of the vehicle and absorbing vibration;

a traveling motor laterally positioned in a lengthwise direction of the vehicle and connected to the frame of the vehicle via the mount members, the mount members being arranged such that at least two mount members oppositely positioned within a width of the traveling motor that runs in the lengthwise direction of the vehicle and the remaining mount members project beyond said width of the traveling motor only on one side along the lengthwise direction of the vehicle;

an air compressor for the fuel cell system directly mounted on the traveling motor; and an air compressor driving motor directly mounted on the traveling motor, wherein the traveling motor, the air compressor and the air compressor driving motor are supported with respect to the frame of the vehicle via the mount members so that the mount members function as shared mounts absorbing vibrations generated at the traveling motor, the air compressor and the air compressor driving motor.

2. A vehicle with a fuel cell system as claimed in claim 1, wherein at least one or more accessories used for the vehicle are directly mounted on the traveling motor.

3. A vehicle with a fuel cell system as claimed in claim 2, wherein said air compressor driving motor drives one or more of said accessories mounted on the traveling motor.

4. A vehicle with a fuel cell system comprising:

mount members attached to a frame of the vehicle and absorbing vibration;

a traveling motor laterally positioned in a lengthwise direction of the vehicle and connected to the frame of the vehicle at both ends thereof via the mount members;

an air compressor for the fuel cell system directly mounted on the traveling motor; and an air compressor driving motor directly mounted on the traveling motor, wherein the traveling motor, the air compressor and the air compressor driving motor are supported with respect to the frame of the vehicle via the mount members so that the mount members function as shared mounts absorbing vibrations generated at the traveling motor, the air compressor and the air compressor driving motor, wherein at least one or more accessories used for the vehicle are directly mounted on the traveling motor, and wherein a width of an area made up of all accessories mounted on the traveling motor runs in a lengthwise direction of the vehicle and is narrower than a width of said traveling motor that runs in a lengthwise direction of said vehicle, and all the accessories are placed within the width of said traveling motor.

5. A vehicle with a fuel cell system as claimed in claim 4, wherein said air compressor driving motor drives one or more of said accessories mounted on the traveling motor.

6. A vehicle with a fuel cell system, comprising:

at least three mount members attached to a frame of the vehicle and absorbing vibration;

a traveling motor connected to the frame of the vehicle via the mount members;

an air compressor for the fuel cell system directly mounted on the traveling motor; and an air compressor driving motor directly mounted on the traveling motor, wherein the traveling motor, the air compressor and the air compressor driving motor are supported with respect to the frame of the vehicle via the mount members so that the mount members function as shared mounts absorbing vibrations generated at the traveling motor, the air compressor and the air compressor driving motor, wherein at least one or more accessories used for the vehicle are directly mounted on the traveling motor, wherein said air compressor driving motor drives one or more of said accessories mounted on the traveling motor, and wherein a control device is further provided for controlling the number of revolutions of said air compressor driving motor and said number of revolutions is controlled in accordance with a load of the accessories driven by said air compressor driving motor.

7. A vehicle with a fuel cell system as claimed in claim 6, wherein a width of an area made up of all accessories mounted on the traveling motor runs in a lengthwise direction of the vehicle and is narrower than a width of said traveling motor that runs in a lengthwise direction of said vehicle, and all the accessories are placed within the width of said traveling motor.

* * * * *